(12) United States Patent
Rom

(10) Patent No.: US 6,182,786 B1
(45) Date of Patent: Feb. 6, 2001

(54) HYDRAULIC STEERING DEVICE

(75) Inventor: Holger Krogsgård Rom, Støvring (DK)

(73) Assignee: Danfoss Fluid Power A/S, Nordborg (DK)

(*) Notice: Under 35 U.S.C. 154(b), the term of this patent shall be extended for 0 days.

(21) Appl. No.: 09/091,111

(22) PCT Filed: Dec. 10, 1996

(86) PCT No.: PCT/DK96/00518

§ 371 Date: Sep. 14, 1998

§ 102(e) Date: Sep. 14, 1998

(87) PCT Pub. No.: WO97/21581

PCT Pub. Date: Jun. 19, 1997

(30) Foreign Application Priority Data

Dec. 12, 1995 (DE) .............................................. 195 46 281

(51) Int. Cl.$^7$ .................................................... B62D 5/08
(52) U.S. Cl. ........................................... 180/441; 180/442
(58) Field of Search .................................. 180/441, 442; 91/375 A, 375 R; 137/625.21, 625.23

(56) References Cited

U.S. PATENT DOCUMENTS

| | | | |
|---|---|---|---|
| 4,884,648 | * 12/1989 | Uchida et al. ....................... | 180/442 |
| 5,092,418 | * 3/1992 | Suzuki et al. ....................... | 180/132 |
| 5,396,969 | * 3/1995 | Joerg et al. ......................... | 180/132 |
| 5,531,286 | * 7/1996 | Majer et al. ........................ | 180/441 |
| 5,797,469 | * 8/1998 | Gerigk ................................. | 180/441 |
| 5,842,538 | * 12/1998 | Sangret ............................... | 180/441 |

* cited by examiner

Primary Examiner—J. J. Swann
Assistant Examiner—Michael Cuff
(74) Attorney, Agent, or Firm—Lee, Mann, Smith, McWilliams, Sweeney & Ohlson

(57) ABSTRACT

A hydraulic steering device is disclosed, having a housing in which an inner control slider and an outer control slider are arranged so that they are rotatable relative to one another and which together are arranged as alterable flow path means between a supply connection arrangement and a working connection arrangement. In such a steering device it is desirable to produce a remote control facility of simple construction. To that end, each control slider is connected to a driving slider, and between the two driving sliders there is created at least one pressure chamber which is acted upon by fluid under pressure, and a change in volume of the pressure chamber effects a relative displacement of the two control sliders.

13 Claims, 2 Drawing Sheets

HYDRAULIC STEERING DEVICE

BACKGROUND OF THE INVENTION

The invention relates to a hydraulic steering device, having a housing in which an inner control slider and an outer control slider are arranged so that they are rotatable relative to one another and which together are arranged as alterable flow path means between a supply connection arrangement and a working connection arrangement.

Such a steering device is known, for example, from DE 43 42 933 A1.

In steering devices of that kind, the supply connection arrangement generally comprises a pump connection and a tank connection. The working connection arrangement generally comprises two working connections. Depending on which of the two working connections is acted upon by pressure, a connected steering motor is moved in one or the other direction.

In most cases the inner control slider is moved by means of a steering handwheel, that is, is rotated with respect to the outer control slider. In this case a flow path between the pump connection and the corresponding working connection, and between the other working connection and the tank connection is unblocked with more or less throttling. Hydraulic fluid therefore flows from the pump by way of the steering motor to the tank again. At the same time, the hydraulic fluid actuates a measuring motor which rotates the outer control slider relative to the inner control slider and thus brings both control sliders into their original aligned position again in which the flow path is closed.

In some cases it is desirable to be able to steer a vehicle that is equipped with such a steering device not only from a driver position using the steering handwheel, but also, for example, in the case of self-propelled working machines, from several positions.

This has primarily been achieved until now by mounting a drive motor on the steering handwheel shaft, which motor, when suitably actuated, takes on the function of the human hand as drive means for that hand wheel shaft. Additional installation space is required for that motor, however.

SUMMARY OF THE INVENTION

The invention is based on the problem of providing a remote control facility of simple construction for the steering device.

In a hydraulic steering device of the kind mentioned in the introduction, that problem is solved in that each control slider is connected to a driving slider, and between the two driving sliders there is created at least one pressure chamber which is acted upon by fluid under pressure, and a change in volume of the pressure chamber effects a relative displacement of the two control sliders.

The customary point of application, namely the steering handwheel shaft, for a remote steering device is therefore abandoned. The remote control now acts directly on the two control sliders and can there effect a relative displacement of the two control sliders. The corresponding generation of torque is effected simply by the pressure loading and the resultant expansion of a pressure chamber, which is formed between the two driving sliders, so that additional external motors can be omitted. The direct intervention in the kinematics of the two control sliders not only enables, as was previously the case, the inner control slider to rotate with respect to the housing, in which case the outer control slider then had to be tracked after it (if the outer control slider was driven the inner control slider had to be tracked); in addition, a relative displacement of the two control sliders in the housing can be effected directly, so that in some cases a movement of the steering handwheel, with the endangering of operating personnel resulting therefrom, can be completely avoided. Moreover, with this kind of remote control other control principles can be pursued. For example, the customary measuring motor can be omitted. Returning of the two control sliders towards their starting position can likewise be effected by the driving sliders, if the associated control signals are made available in a different manner.

In that case is it especially preferred for at least one control slider to be formed in one piece with the driving slider associated with it. This simplifies the construction. The one-piece construction of driving slider and control slider means that additional fixing elements are no longer needed.

In an advantageous construction, provision is made for the two driving sliders to be arranged concentrically with respect to one another, the pressure chamber being arranged in an annular gap between the two driving sliders and each driving slider having a projection protruding into the annular gap and bearing against the other driving slider, which projection bounds the pressure chamber circumferentially. In this construction the increase in volume, which is effected for example, when fluid under pressure is admitted to the pressure chamber, directly causes a torque and thus a rotation of the two sliders relative to one another. No further measures are required. The size of the projections, that is, the amount they extend radially and axially, determines the available pressure application surface, which in turn, together with the pressure in the pressure chamber, defines the torque generated. Even with a relatively small annular gap, the torque required for displacing the two control sliders relative to one another can nevertheless be produced.

It is also preferred for the projections to be rounded at their free end. The free end is the end of the projections with which they lie against the respective other driving slider. This rounding reduces wear and to a certain extent improves the options available for sealing.

Preferably, each projection serves as a boundary for two pressure chambers. The possibility of being able to actuate the steering device in both directions is improved with two pressure chambers. The restoring forces are easier to apply.

Preferably, more than two pressure chambers are provided. The number of projections, and thus the number of surfaces that are available to receive pressure, also increases accordingly. In this manner, the torque can be multiplied without particular difficulties. From the point of view of the space required, in most cases it is also possible to accommodate more than two pressure chambers, because the relative displacement of the two control sliders is mostly merely less than 20° and the pressure chambers do not need to be very much bigger than that.

Preferably, an even number of pressure chambers is provided. The effect of the driving sliders in the two steering directions can thus be made uniform.

Advantageously, the fluid under pressure comes from the same pressure source as the hydraulic fluid used for the steering device. An additional pressure source is not therefore needed. The hydraulic fluid is generally available at the necessary pressure anyway. Since only a comparatively small amount of hydraulic fluid is used to operate the driving sliders, an economical operation can be achieved in this manner.

Advantageously, a control device is arranged between each pressure chamber and the pressure source. The pressure in the individual pressure chambers can then be set at will to a specific value, so that the desired relative rotation of the two driving sliders and the relative rotation of the two control sliders resulting therefrom can be effected.

The control device preferably has pulse-controlled electromagnetic valves. Using the pulse-controlled electromagnetic valves the desired pressure can be set with relatively few problems by means of the pulse duty factor. The pulse duty factor is the ratio of the open time of an electromagnetic valve to the time of a complete period, that is, the sum of the open and the closed time.

It is also an advantage that the pressure chambers are divided into two pressure chamber groups, and that for each pressure chamber group an electromagnetic valve is provided in series with a throttle, the pressure chamber group being connected to a tapping-point between the electromagnetic valve and the throttle. Because the pressure chambers are uniformly combined to form a pressure chamber group, in each pressure chamber of a group the pressure is the same, so that the application of torque in the circumferential direction is very uniform. The use of a single electromagnetic valve per group with a throttle enables a relatively simple control system to be created.

The pressure chambers together with the throttles are preferably in the form of a damping arrangement. In this manner, damping between the two sliding members is achieved. Any tendency to oscillate can therefore be prevented very easily. This is a significant advantage, in particular in the case of vehicles with centre-pivot steering.

It is also an advantage for the common connection of the throttles to be connected to a load-sensing control line. In this manner, the pressure drop across the electromagnetic valves and the throttles can always be kept constant. This facilitates, for example, electronic triggering of the electromagnetic valves.

BRIEF DESCRIPTION OF THE DRAWINGS

The invention is described hereinafter with reference to a preferred embodiment in conjunction with the drawings, in which.

DESCRIPTION OF THE PREFERRED EMBODIMENT

Figure 1:
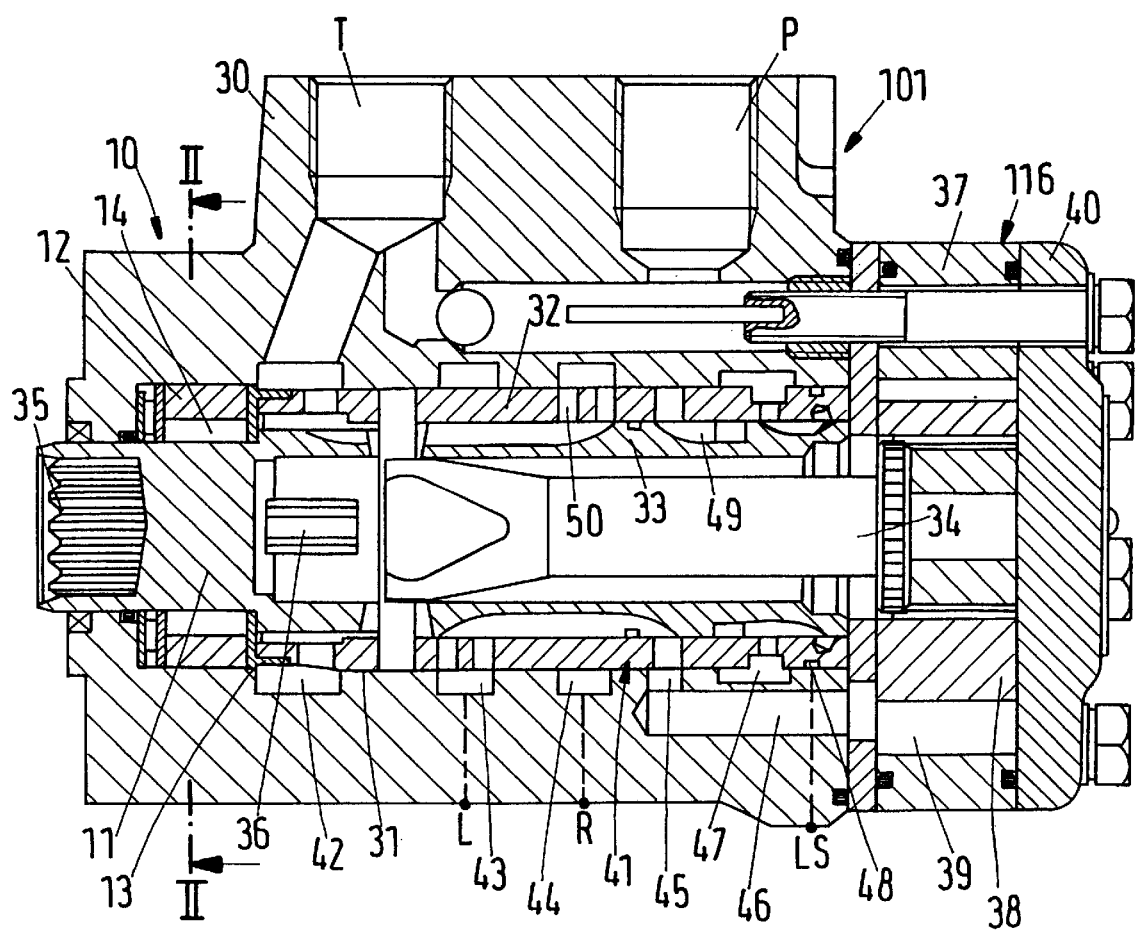
FIG. 1 is a diagrammatic longitudinal section through a steering device.

FIG. 1 shows diagrammatically a steering device 101 with a housing 30 that has a housing bore 31. An outer control slider 32 and in it an inner control slider 33 are rotatably mounted in the housing bore 31. An articulated shaft 34 connects a measuring motor 116 to the outer control slider 32. The inner control slider 33 is arranged to be connected by way of a coupling 35 to a steering handwheel shaft, not illustrated. The coupling is here in the form of a multiple-spline shaft into which the steering handwheel shaft can be inserted.

The inner control slider 33 and the outer control slider 32 are connected to one another by way of leaf springs 36 which allow the two control sliders 32, 33 to rotate relative to one another to a limited extent.

The measuring motor 116 is a gearwheel motor which has an outer toothed ring 37 and an inner gearwheel 38, between which there are displacement chambers 39; the entire assembly is covered over by a cover 40. The two control sliders 32 and 33 form a flow path arrangement 41.

The flow path arrangement 41 connects different connections selectively and with different throttlings. For that purpose there is an annular groove 42 that is connected to a tank connection T, an annular groove 43 that is connected to a left-hand working connection L, an annular groove 44 that is connected to a right-hand working connection R, a series of control openings 45 that are connected by way of axial channels 46 to respective displacement chambers 39, an annular groove 47 that is connected to a pump connection P, and an annular groove 48 that is connected to a control signal connection LS.

Furthermore, there are a number of axial channels, for example, 49, and a number of control openings, for example, 50. Together, they all form the flow path arrangement between the supply connection arrangement, which is here formed by the pump connection P and the tank connection T, and the working connection arrangement, which is here formed by the connections L and R.

The construction and the mode of operation of such a steering device are known per se. When the inner control slider member 33 is rotated relative to the outer control slider member 32 by means of the steering handwheel shaft, a flow path is opened from the pump connection P to, depending on the direction, one of the two working connections L, R. Another flow path opens correspondingly from the other working connection R, L to the tank connection T. At the same time, hydraulic fluid acts on the measuring motor 116. The gearwheel 38 then rotates in accordance with the amount of hydraulic fluid fed in and tracks the outer control slider 32 onto the inner control slider 33 until the neutral position is reached again and the individual flow paths have been interrupted again.

In addition to the provision made in the steering device 101 for actuating the inner control slider 33 by means of the steering handwheel shaft by way of the coupling 35, there is also provision for remote control. For that purpose a driver device 10 is arranged in the region of the end of the two control sliders 32, 33 on which also the coupling 35 is mounted.

Figure 2:
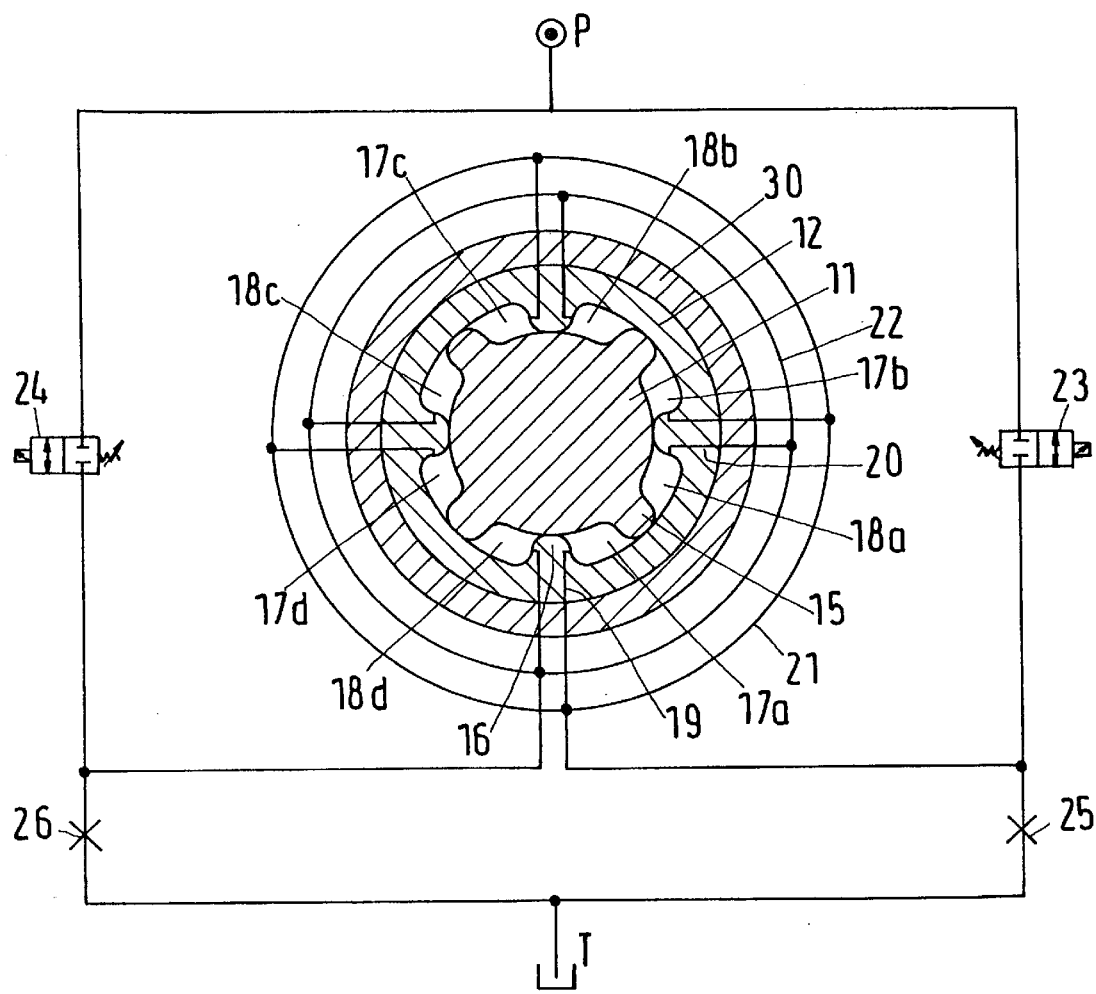
FIG. 2 is a diagrammatic sectional view II—II according to FIG. 1.

The driver device 10 is illustrated diagrammatically in section in FIG. 2. It has an inner driving slider 11 and an outer driving slider 12, which are mounted concentrically in the bore 31 in the housing 30. Rotation of the two driving sliders 11, 12 relative to one another and rotation of the driving sliders 11, 12 relative to the housing 30 is thus possible.

As can be seen from FIG. 1, the inner driving slider 11 is in one piece with the inner control slider 33. The outer driving slider 12 can likewise be formed in one piece with the outer control slider 32. In this particular case, however, it is connected by way of a connecting means 13 to the outer control slider 32.

Between the two driving sliders 11, 12 there is an annular space 14 which has the form of a circular ring in cross-section.

The inner control slider has four radially outwardly projecting projections 15, which pass through the annular space 14 and bear against the outer control slider 12 or, more accurately, against the inner wall thereof. Similarly, the outer driving slider 12 has four projections 16 which pass radially through the annular space 14 and bear against the inner driving slider 11. In this manner a total of eight pressure chambers 17a, 17b, 17c, 17d, 18a, 18b, 18c, 18d are formed. Each pressure chamber can be loaded with pressure by way of a pressure line 19, 20. The pressure lines 19 for the pressure chambers 17a, 17b, 17c, 17d are here combined to form a group by a ring line 21. The pressure lines 20 for the pressure chambers 18a, 18b, 18c, 18d are combined to form a group by way of a ring line 22.

A control device, comprising the series connection of a pulse-controlled electromagnetic valve 23 (for the pressure chambers 17), 24 (for the pressure chambers 18) and a throttle 25, 26, is provided for each group, the pressure chambers 17 being connected with a tapping-point between the electromagnetic valve 23 and the throttle 25 and the pressure chambers 18 being connected with a tapping-point between the electromagnetic valve 24 and the throttle 26. Both paths 23, 25 and 24, 26 are arranged parallel to one another between the pump connection P and the tank connection T.

The electromagnetic valves 23, 24 are pulse-controlled. Within a predetermined period they are therefore in the open position for a variable time and for the rest of the time in that period are in the closed position. A mean opening degree can thus be set which determines the throttling resistance of the electromagnetic valve 23, 24.

When the two throttles 25, 26 have the same properties, on uniform triggering of the two pulse-controlled electromagnetic valves 23, 24 there is a pressure equilibrium between the pressure chambers 17 and the pressure chambers 18. The position that the inner driving slider 11 has assumed with respect to the outer driving slider 12 is not changed thereby. If, however, the electromagnetic valve 23 is opened more, the pressure in the pressure chambers 17 increases, and the inner driving slider 11 rotates anticlockwise in the illustration according to FIG. 2 relative to the outer driving slider 12. If, because of some influence or other, the steering handwheel is held in a fixed position, the outer driving slider 12 can also rotate clockwise relative to the inner driving slider 11. The effect is virtually the same in both cases. The desired relative displacement of inner control slider 33 to outer control slider 32 is achieved, accompanied by the desired actuation of the steering motor connected to the working connections L, R.

Even more pressure chambers than the illustrated eight pressure chambers are, of course, possible. Generally speaking, the maximum adjustability between inner and outer control slider is about 15°. Accordingly, the pressure chambers need be no larger circumferentially. The more pressure chambers used, the more pressure application surfaces there are available circumferentially and the larger at the same pressure can the generated torque be made.

The projections 15, 16 are rounded at their free end, that is, at the end with which they bear against the respective other driving slider 12, 11. This rounding reduces wear and improves the seal.

What is claimed is:

1. Hydraulic steering device for operation from a connected steering device and by remote control, the steering device having a housing in which an inner control slider and an outer control slider are arranged so that they are rotatable relative to one another and which together are arranged as alterable flow path means between a supply connection arrangement and a working connection arrangement, the inner control slider being connected to a first driving slider and the outer control slider being connected to a second driving slider, and at least one pressure chamber being formed between the driving sliders, the pressure chamber being acted upon by fluid under pressure from a remote pressure source, with a change in volume of the pressure chamber effecting a relative displacement of the two control sliders.

2. Steering device according to claim 1, in which at least one of the control sliders is formed in one piece with the driving slider to which it is connected.

3. Steering device according to claim 1, in which the driving sliders are arranged concentrically with respect to one another, the pressure chamber being located in an annular gap between the driving sliders and each driving slider having a projection protruding into the annular gap and bearing against the other driving slider, which projection forms a circumferential boundary of the pressure chamber circumferentially.

4. Steering device according to claim 3, in which the projections are rounded at their free end.

5. Steering device according to claim 3, in which each projection forms a circumferential boundary for two pressure chambers.

6. Steering device according to claim 1, including more than two pressure chambers.

7. Steering device according to claim 6, including an even number of pressure chambers.

8. Steering device according to claim 1, in which the fluid under pressure comes from the same pressure source as hydraulic fluid used for the steering device.

9. Steering device according to claim 6, including a control device located between each pressure chamber and the pressure source.

10. Steering device according to claim 9, in which the control device includes pulse-controlled electromagnetic valves.

11. Steering device according to claim 10, in which the pressure chambers are divided into two pressure chamber groups, each pressure chamber group having a said electromagnetic valve in series with a throttle, each pressure chamber group being connected to a tapping-point between the electromagnetic valve and the throttle.

12. Steering device according to claim 11, in which the pressure chambers together with the throttles comprise a damping arrangement.

13. Steering device according to claim 11, in which a common connection of the throttles is connected to a load-sensing control line.

* * * * *